United States Patent [19]
van der Lely

[11] 4,111,267
[45] Sep. 5, 1978

[54] ROTARY HARROWS

[76] Inventor: Cornelis van der Lely, 7, Brüschenrain, Zug, Switzerland

[21] Appl. No.: 759,668

[22] Filed: Jan. 17, 1977

Related U.S. Application Data

[62] Division of Ser. No. 553,693, Feb. 27, 1975, Pat. No. 4,018,288.

[30] Foreign Application Priority Data

Mar. 1, 1974 [NL] Netherlands .................... 7402788

[51] Int. Cl.² .................................. A01B 33/06
[52] U.S. Cl. ........................................ 172/59; 172/70
[58] Field of Search ................ 172/59, 112, 199, 200, 172/70, 63, 68, 49

[56] References Cited

U.S. PATENT DOCUMENTS

| | | | |
|---|---|---|---|
| 1,082,552 | 12/1913 | Pinet | 172/199 |
| 2,513,186 | 6/1950 | Leaman | 172/49 |
| 3,821,989 | 7/1974 | Lely et al. | 172/59 |
| 3,841,411 | 10/1974 | Lely et al. | 172/59 |
| 3,892,278 | 7/1975 | Smith | 172/70 |
| 3,930,542 | 1/1976 | Lely et al. | 172/59 |
| 4,018,288 | 4/1977 | Lely | 172/395 |
| 4,042,041 | 8/1977 | Lely | 172/49 |

FOREIGN PATENT DOCUMENTS

7,116,820  6/1973  Netherlands ............................. 172/59

Primary Examiner—Richard J. Johnson
Attorney, Agent, or Firm—Mason, Mason & Albright

[57] ABSTRACT

A rotary harrow has a plurality of soil working members rotatably mounted on upwardly extending shafts and the shafts are journalled in an elongated frame portion that extends transverse to the direction of travel. A protective and supporting member of elongated configuration is secured to the frame portion by arms that are pivoted to that portion. The protective member can be nonrotatable but is angularly displaceable about a horizontal axis that extends generally parallel to the frame portion. The protective member has an inclined surface that can be curved or substantially flat and the outer surface faces the soil working members and is positioned relative to those members to direct debris downwardly to the ground.

4 Claims, 10 Drawing Figures

ROTARY HARROWS

This application is a division of U.S. Ser. No. 553,693, filed Feb. 27, 1975, now U.S. Pat. No. 4,018,288.

According to one aspect of the invention, there is provided a rotary harrow of the kind set forth, wherein a surface of said protective member that faces the soil working members of the harrow and that is located close to those members is so shaped and/or disposed that, considered downwardly from at least a level midway between its top and bottom, the distance between that surface and a verical plane containing the axes of rotation of a row of the soil working members becomes greater.

For a better understanding of the invention, and to show how the same may be carried into effect, reference will now be made, by way of example, to the accompanying drawings, in which.

Referring to FIGS. 1 to 5 of the drawings, those Figures illustrate a rotary harrow which could also be considered as being a soil cultivating implement or cultivator. The harrow has a hollow box-shaped frame portion 1 that extends substantially horizontally transverse, and normally substantially horizontally perpendicular, to the intended direction of operative travel of the harrow that is indicated by an arrow A in FIGS. 1, 2, 6, 8 and 10 of the drawings. A plurality (in this case, twelve) of vertical or substantially vertical shafts 2 are rotatably journalled in the hollow frame portion 1 and extend in a single row in regularly spaced apart relationship. The longitudinal axes $a$ (axes of rotation) of the shafts 2 are spaced apart from one another by distances which should not be greater than 30 centimeters and which it is preferred should have magnitudes of substantially 25 centimeters. Each shaft 2 has a corresponding rotary soil working member 2A fastened to its lowermost end that projects from beneath the frame portion 1 and, accordingly, the axes $a$ are also the axes of rotation of the soil working members 2A. The portion of each shaft 2 that projects from beneath the frame portion 1 is splined (see FIG. 5) and receives a substantially cylindrical boss at the center of a substantially horizontally disposed tine support 3, the internal bore of said boss being splined to match the splines on the co-operating shaft 2. The interengaging splines ensure that the soil working member 2A is fast in rotation with its shaft 2 at all times, axial disengagement of the tine support 3 from the shaft 2 being prevented by tightening a fastening nut 4, provided with a co-operating washer, onto a short lowermost screwthreaded portion of the shaft 2 that extends beneath the splined portion thereof. A split pin 5 is employed to prevent accidental loosening of the nut 4. Two substantially cylindrical tine holders 6 are arranged at the opposite ends of each tine support 3 and receive the fastening portions 8 of rigid soil working tines 9 in a manner that will be described in greater detail below. The longitudinal axis of each tine support 3 extends substantially perpendicular to the longitudinal axis $a$ of the corresponding shaft 2 and it will be noted that each support 3, including the central boss thereof, the corresponding tine holders 6 and two screens 7, is formed integrally from a single piece of metallic material by forging or casting.

Figures 1, 5:
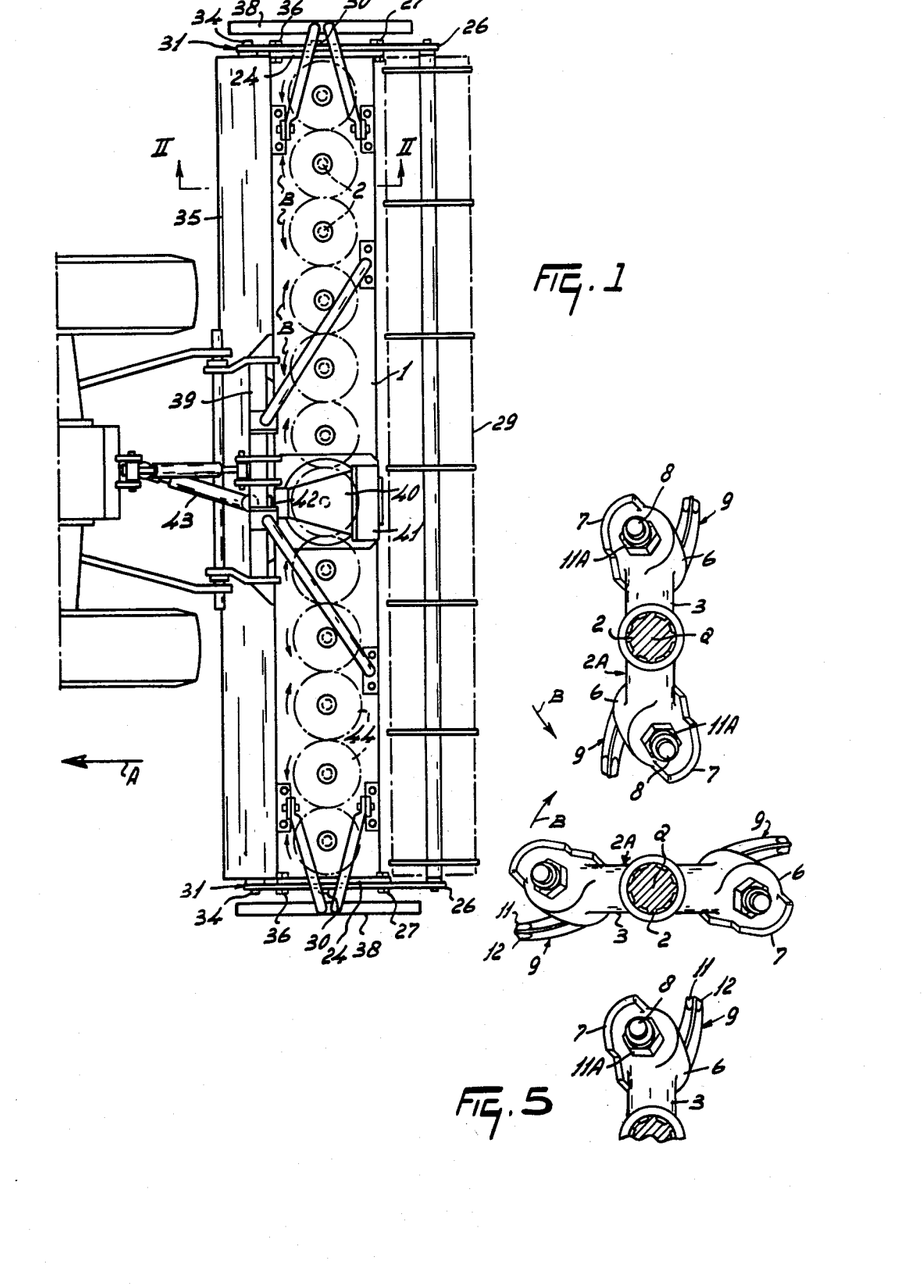
FIG. 1 is a plan view of a rotary harrow in accordance with the invention connected to the rear of an agricultural tractor.
FIG. 5 is a part-sectional plane view, to an enlarged scale, illustrating the construction and arrangement of three soil working members of the harrow of FIG. 1 in greater detail.
Figure 2:
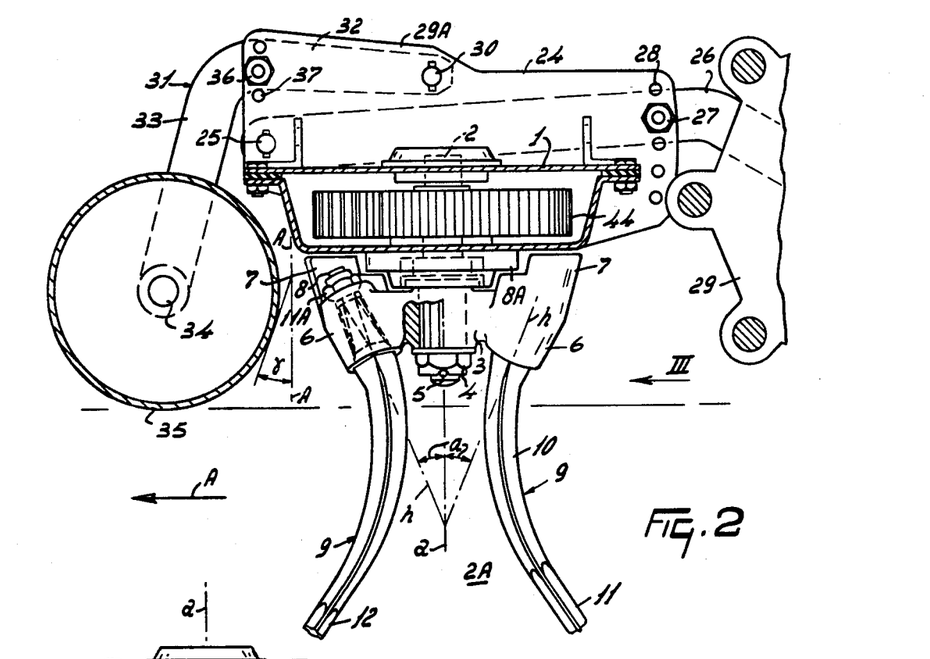
FIG. 2 is a section, to an enlarged scale, taken on the line II—II in FIG. 1.
Figure 3:
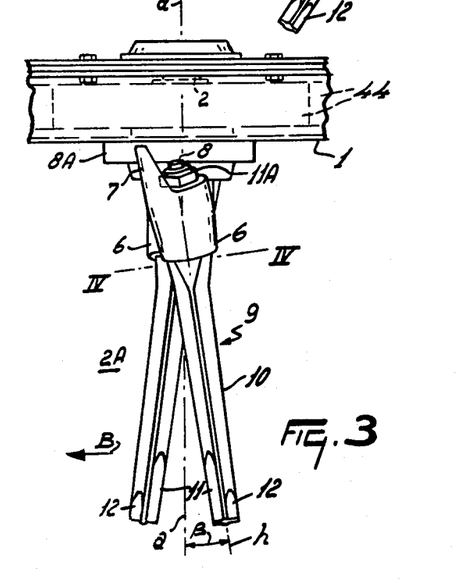
FIG. 3 is an elevation as seen in the direction indicated by an arrow III in FIG. 2.

It can be seen from FIG. 2 of the drawings, which is a view in a direction horizontally perpendicular to the longitudinal axis of the tine support 3 that is visible in that Figure, that, from such a viewpoint, the longitudinal axis of each sleeve-like holder 6 is inclined to the corresponding axis $a$ by an angle $\alpha$ which has a magnitude that it is preferred should not be less than 24°. The longitudinal axes of the two tine holders 6 that correspond to each soil working member 2A thus diverge in an upward direction with the result that the opposite ends of the whole support 3 are further apart from one another at the top thereof than they are at the bottom thereof. Again as seen in FIG. 2 of the drawings, the opposite ends of the illustrated support 3 that are afforded by the two tine holders 6 are bevelled downwardly from the top towards one another. As viewed in a direction parallel to the longitudinal axis of the support 3 (i.e. as seen in FIG. 3 of the drawings), the longitudinal axes $h$ of the tine holders 6 are both non-perpendicularly inclined to the longitudinal axis of the support 3 in such a way that the top of each holder 6 is further advanced with respect to the intended direction of rotation B (FIGS. 1, 3 and 5) of the corresponding soil working member 2A than is the bottom thereof. As seen in FIG. 3 of the drawings, the longitudinal axis $h$ of each tine holder 6 is inclined to the corresponding axis of rotation $a$ at an angle $\beta$ which preferably has a magnitude of substantially 8° and which it is preferred should not be less than substantially 8°.

The front of each tine support 3 with respect to the direction B has a downwardly and rearwardly inclined surface which merges with a similarly disposed surface at the front of each holder 6. Although not strictly parallel to the axes $h$, the front surfaces of the holder 6 with respect to the direction B may be considered as being substantially parallel to the corresponding axes $h$. The top and front, with respect to the direction B, of each tine holder 6 is provided with the previously mentioned corresponding integral screen 7 which extends upwardly to a level immediately beneath that of the bottom of the hollow frame portion 1 (see FIGS. 2 and 3 of the drawings). The uppermost portion of each screen 7 is thus substantially horizontally disposed but the screen 7 decreases in height, in a stepped manner, towards the corresponding axis $a$, to match the shape of a housing 8A for the lower bearing that rotatably supports the corresponding shaft 2. The front of each screen 7 with respect to the direction B is substantially, although not exactly, in line with the front of the corresponding tine holder 6 with respect to the same direction as will be evident from FIG. 3, in particular, of the drawings.

Each sleeve-like tine holder 6 receives the fastening portion 8 of a corresponding one of the soil working tines 9, each tine 9 also including a lower active or soil working portion 10. The fastening portion 8 of each tine 9 has a first upwardly tapering part that is of regular polygonal cross-section which commences at the level of the integral junction between the portions 8 and 10 of the tine. This first upwardly tapering part of the tine fastening portion 8 cooperates with a matchingly shaped part of the internal bore of the corresponding tine holder 6 and said first upwardly tapering part, at its upper end, joins a second upwardly tapering part that has approximately three times the axial length of the first upwardly tapering part but that is of much less steeply tapering configuration. The second upwardly tapering part of the tine fastening portion 8 also cooperates with a matchingly shaped part of the internal surface of the corresponding tine holder 6. The extreme upper end of the tine fastening portion 8 is formed as a short screwthreaded portion of basically circular cross-section which portion projects upwardly beyond the upper end of the cooperating tine holder 6 when the portion 8 is entered in that holder. A retaining nut 11A is screwed onto the threaded end of the tine fastening portion 8 and has a downwardly tapering frusto-conical lower surface which cooperates centringly with a matchingly shaped mouth at the extreme upper end of the central bore through the corresponding tine holder 6.

Figure 4:
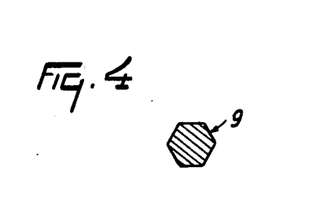
FIG. 4 is a section taken on the line IV-IV in FIG. 3.

At the junction between the fastening portion 8 and the active or soil working portion 10 of each tine 9, said tine has a polygonal cross-section which, as illustrated in FIG. 4 of the drawings, is preferably a regular hexagon. The active or soil working portion 10 tapers gently from the level of FIG. 4 of the drawings to the lowermost free end or tip of the tine and is of curved formation throughout a major portion of its length which commences at its integral junction with the fastening portion 8. A free end or tip region of the active or soil working portion 10 that is of shorter length than the curved region is of substantially rectilinear configuration. The curved region of the active or soil working portion 10 of each tine 9 has such a curvature, and the tine 9 is so arranged, that, from its junction with the corresponding fastening portion 8, the active or soil working portion 10 initially extends towards the corresponding axis of rotation $a$ and therefore, as seen in a direction horizontally perpendicular to the longitudinal axis of the corresponding tine support 3 (i.e. as seen in FIG. 2 of the drawings), each active or soil working portion 10 is disposed closest to the corresponding axis $a$ at a location between its opposite uppermost and lowermost ends. In the embodiment illustrated said location is significantly nearer to the upper end of each active or soil working portion 10 that it is to the lower end thereof, said portion 10 preferably having a length of substantially 25 centimeters. The distance between the free ends or tips of the two active or soil working tine portions 10 that correspond to each soil working member 2A is greater than the maximum distance between the opposite ends of the corresponding tine support 3, which support 3 should be considered as being a tine mounting that includes the corresponding tine holders 6 and screens 7. Each tine support 3 thus has a maximum length which is not more than, and is preferably less than, the perpendicular distance between the longitudinal axes $a$ of two immediately neighbouring shafts 2.

Considered downwardly from the integral junction between the fastening portion 8 and the active or soil working portion 10 of each tine 9, the active or soil working portion 10 has a regular hexagonal cross-section (FIG. 4) which progressively changes into a rectangular cross-section and, when the rectangular cross-section is attained, the length of diagonals (as seen in cross-section) between the opposite corners thereof change with flattening of the tine until, at and very near the extreme lowermost free end or tip thereof, the ratio between the lengths of the two diagonals is substantially 2:1. The longer of the two diagonals at this level is substantially tangential to a circle centered upon the corresponding axis $a$. Each of the what would otherwise be four substantially flat sides of the active or soil working portion 10 of each tine 9 in a lowermost free end or tip region thereof is formed with a hollow recess or groove that commences at the extreme free end or tip that extends upwardly along the tine therefrom. There are two recesses or grooves 11 in the sides of each tine portion 10 that face obliquely forwards with respect to the direction B and two recesses or grooves 12 in the sides thereof that face obliquely rearwards with respect to the direction B, the leading recesses or grooves 11 having substantially twice the length along the tine 9 of the trailing recesses or grooves 12. The leading longer recesses or grooves 11 have lengths which are each equal to substantially one-third of the length of the corresponding active or soil working tine portion 10.

In the embodiment which is being described, the tines 9 are constructed and are mounted in such a way that the center lines of their fastening portions 8 and active or soil working portions 10 (it being remembered that these center lines are partially curved) are contained in corresponding single planes that are inclined to the axes $a$ and thus, normally, to the vertical. As viewed in a horizontal direction perpendicular to the longitudinal axis of one of the tine supports 3 (i.e. as seen in FIG. 2 of the drawings), the longitudinal axis of each substantially straight free end or tip region of each active or soil working tine portion 10 is substantially parallel to the longitudinal axis $h$ of the tine holder 6 that corresponds to the other tine 9 of the same soil working member 2A. It will, of course, be realised that, when a tine 9 is fixed in its appointed position, the longitudinal axis of its fastening portion 8 and the longitudinal axis $h$ of the holder 6 in which that fastening portion 8 is lodged will be coincident. When the rotary harrow is in operation, the tines 9 of neighbouring soil working members 2A thereof work overlapping strips of soil to produce, in effect, a single broad strip of worked soil.

Figure 6:
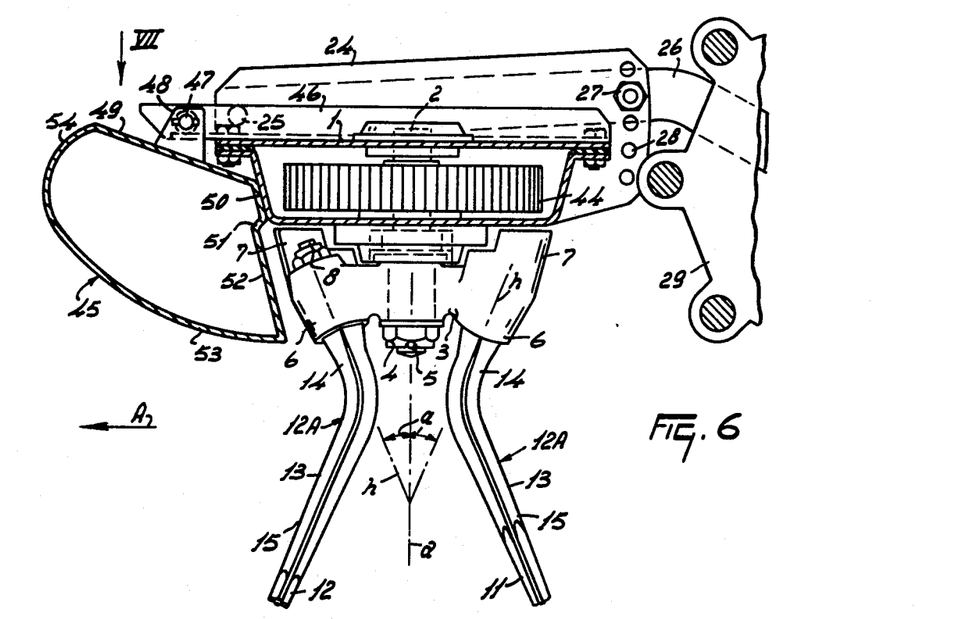
FIG. 6 is a section, to an enlarged scale, taken on the line II—II in FIG. 1 but illustrates an alternative construction of some parts of the harrow.

FIG. 6 of the drawings illustrates the use of tines 12A that are substantially identical in construction and mounting to the previously described tines 9 except that the tines 12A have active or soil working portions 13 each of which comprises two substantially straight regions 14 and 15 that are interconnected by a corresponding sharply curved part. With this construction, the two portions 13 that corresponds to each soil working member 2A are closest to each other and to the corresponding axis $a$, at a location between their ends. The free ends or tips of the two active or soil working portions 13 of each soil working member 2A are, as in the preceding embodiment, spaced apart from one another, and from the corresponding axis $a$, by a greater distance than are the opposite ends of the tine support 3 or mounting which should be considered as including the holders 6 and screens 7 in that regard. The angle which is enclosed between the longitudinal axes of the two straight regions 14 and 15 of each active or soil working tine portion 13 is equal, or substantially equal, to the angle $\alpha$ that is enclosed between the longitudinal axis $h$ of each tine holder 6 (and of the corresponding tine fastening portion 8 when lodged in that holder) and the corresponding axis of rotation $a$. Each upper straight region 14 has a length which is equal to substantially one-quarter of the total length of the corresponding active or soil working tine portion 13, said length of the region 14 also being substantially one-third of the length of the corresponding region 15.

Figure 8:
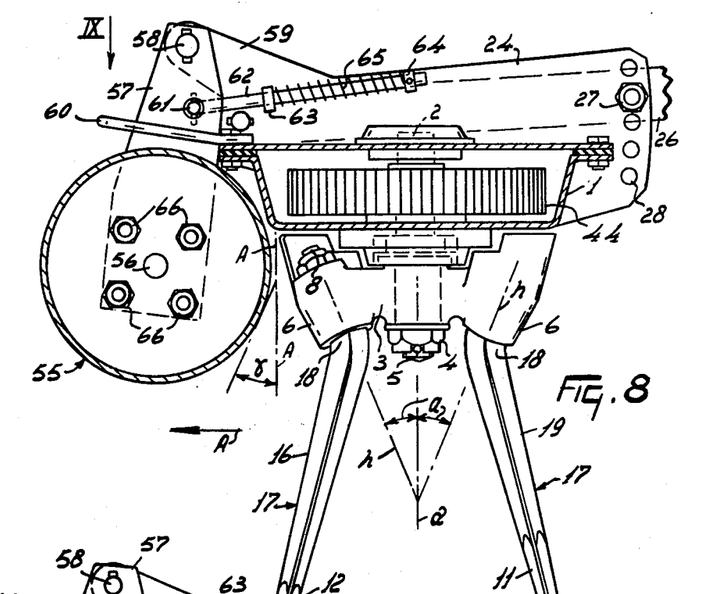
FIG. 8 is a further section, to an enlarged scale, taken on the line II—II in FIG. 1 but illustrates another alternative construction for some parts of the harrow.

FIG. 8 of the drawings illustrates the employment of tines 17 whose fastening portions 8 are adjoined by very short straight regions 18 of active or soil working portions 16 of the tines. As seen in a direction substantially horizontally perpendicular to the longitudinal axis of each tine support 3 (i.e. as seen in FIG. 8 of the drawings), the fastening portions 8 and the very short straight regions 18 of each tine 17 are in longitudinal alignment with one another. The active or soil working portions 16 also include much longer straight regions 19 that integrally adjoin the short straight regions 18 and that are outwardly directed away from the axis $a$ with their longitudinal axes inclined to the longitudinal axes $h$ of the fastening portions 8 and tine holders 6 by an angle which is a little greater in magnitude than the angle $\alpha$. Once again, the distance between the free ends or tips of the two active or soil working portions 16 of the two tines 17 of one soil working member 2A is not less, and is preferably a little greater, than the distance between the extreme free ends of the corresponding tine support 3. The tines 17 are otherwise substantially identical to the tines that have been described above.

Figure 10:
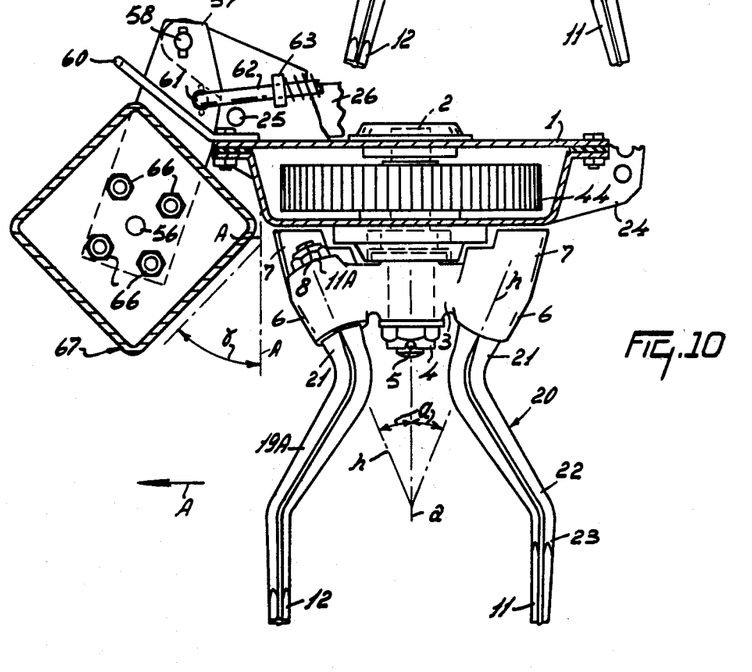
FIG. 10 is a section, to an enlarged scale, taken on the line II—II in FIG. 1 but illustrates a still further alternative construction for some parts of the harrow.

FIG. 10 of the drawings illustrates the provision of tines 20 which have active or soil working portions 19A that comprise three regions 21, 22 and 23. The fastening portion 8 of each tine 20 is adjoined by the region 21, which is a short straight region that is axially in line with the fastening portion 8. The region 22 is also straight and is integrally connected to the region 21 by a bend whose orientation is such that the region 22 is inclined downwardly and outwardly away from the region 21 with respect to the axis $a$. The lowermost end of the straight region 22 is integrally connected to the region 23, which is a straight free end or tip region, by a further bend, this latter bend being so dimensioned and orientated that the free end or tip region 23 extends substantially longitudinally parallel to the axis $a$ when the soil working member 2A concerned is viewed in a direction substantially horizontally perpendicular to the longitudinal axis of its tine support 3 (i.e. as seen in FIG. 10 of the drawings). The free end or tip region 23 of each tine 20 has a length which is equal to substantially one-third of the total length of the active or soil working portion 19A of that tine, the recesses or grooves 11 and 12 being formed in the free end or tip region 23 at the front and rear thereof with respect to the intended direction of rotation B. Each straight region 22 has a length which is substantially half the total length of the corresponding active or soil working portion 19 A and each short straight region 21 has a length which is substantially half that of the corresponding free end or tip region 23. The longitudinal axis of each straight portion 22 is parallel or substantially parallel to the longitudinal axis $h$ of the fastening portion 8 of the other tine 20 of the same soil working member 2A. It will be remembered that, when one of the tine fastening portions 8 is installed in the corresponding tine holder 6, the longitudinal axes of both that fastening portions 8 and the corresponding holder 6 are coincident. The free ends or tips of the two tines 20 of each soil working member 2A are, in the embodiment of FIG. 10 of the drawings, spaced apart from each other by a distance which is greater than the distance between the axes $a$ of two immediately neighbouring shafts 2.

Referring again to FIGS. 1 and 2, in particular, of the drawings, it will be seen that the opposite ends of the hollow frame portion 1 carry vertical sector plates 24 that both extend substantially parallel to the direction A. The fronts of the two sector plates 24 with respect to the direction A carry substantially horizontally aligned pivots 25 about which arms 26, that extend rearwardly from said pivots 25 with respect to the direction A, are upwardly and downwardly turnable alongside the corresponding sector plates 24. The rearmost edge of each sector plate 24 is formed with a curved row of holes 28 in which each hole is equidistant from the axis defined by the pivots 25 and the corresponding arm 26 is formed with a single hole that can be brought into register with any chosen one of the holes 28 by turning the arm to an appropriate angular setting about the corresponding pivot 25. Horizontal bolts 27 are provided for entry through the single holes in the arms 26 and the holes 28 that are chosen to retain the arms 26 in corresponding angular settings about the pivots 25 with respect to the hollow frame portion 1. A rotatable supporting member 29 in the form of a ground roller is rotatably mounted about a substantially horizontal axis between the rearmost downwardly orientated ends of the two arms 26, said ground roller being of open, rather than closed, substantially right circular cylindrical configuration and being arranged to extend throughout substantially the whole of the working width of the soil working members 2A. It will be appreciated that the angular setting of the arms 26 about the pivots 25 which is chosen determines the level of the axis of rotation of the supporting member 29 relative to the remainder of the harrow and is thus an important factor in determining the depth of penetration of the tines of the soil working members 2A into the ground during operation of the harrow.

An upper front, with respect to the direction A, region of each sector plate 24 is formed as an integral supporting plate 29 A (FIG. 2) and the rear of each of those supporting plates carries a substantially horizontal pivot 30, the two pivots 30 being in aligned relationship. An angular supporting arm 31 is turnable about each pivot 30 alongside the corresponding supporting plate 29A it being one straight limb 32 thereof which is disposed alongside the plate 29A and which, as a consequence, extends substantially parallel to the direction A. The axis defined by the pivots 30 is substantially parallel to that defined by the pivots 25 and is thus substantially horizontally perpendicular to the direction A. The leading end of each straight limb 32 with respect to the direction A is bent over downwardly to join the other straight limb 33 of the same supporting arm 31 which limb, as seen in FIG. 2 of the drawings, is inclined downwardly, and forwardly by a few degrees with respect to the direction A, from its curved junction with the limb 32. The lowermost free ends of the straight limbs 33 of the two angular supporting arms 31 carry substantially horizontally aligned stub shaft 34 around which a supporting member 35, in the form of a right circular cylindrical roller, is rotatable. It will be noted that, in other embodiments, the supporting member at the front of the harrow is not necessaryly rotatable nor is its cylindrical configuration necessarily of circular cross-section. The greatest width of the supporting member 35 in the direction A which, in this case, is also its diameter, is substantially equal to, or greater than, the distance between the axes *a* of two immediately neighbouring shafts 2. The same dimension of the supporting member 35 is also substantially equal to the length of the active or soil working portion 10 of one of the corresponding tines 9 and it will be remembered that both this length and the distance betweenimmediately neighbouring axes *a* has been stated to have a preferred magnitude of substantially 25 centimeters.

The supporting member 35 extends throughout substantially the whole of the working width of the rotary harrow and it will be seen from FIG. 2 of the drawings that it is located completely in front, with respect to the direction A, of the hollow frame portion 1 apart from a narrow overlying edge region of that frame portion. The rotatable supporting member 35 can have its axis of rotation set at any chosen one of a number of different levels relative to the remainder of the harrow by turning the angular supporting arms 31 upwardly or downwardly alongside the supporting plates 29A to bring single holes in the straight limbs 32 thereof into register with chosen holes 37 in curved rows of those holes that are formed near the front edges of the supporting plates 29A with respect to the direction A at equal distances from the axis defined by the pivots 30. Horizontal bolts 36 are provided for entry through the single holes in the arms 31 and the chosen holes 37 to retain those arms in corresponding angular settings about the pivots 30 and thus to retain the axis of rotation of the supporting member 35 at a corresponding level relative to the remainder of the harrow. It will be noted that, in the position illustrated in FIG. 2 of the drawings, the level of the stub shafts 34 and thus the level of the axis of rotation of the supporting member 35 is substantially the same as the level of the retaining nuts 11A that maintain the fastening portions 8 of the tines 9 firmly in their holders 6. The bottom of the supporting member 35 that is in engagement with the ground surface is located at a level beneath that of the bottoms of the tine holders 6. The lower half of that region of the external surface of the supporting member 35 that faces the soil working members 2A is progressively further from a plane A—A (FIG. 2) that is parallel to a plane containing the longitudinal axes *a* of all of the shafts 2 of the single row of those shafts as one moves downwardly along that surface towards the ground. A plane that is tangential to the region concerned near the center thereof is inclined to the plane A—A by an angle $\gamma$ whose magnitude is substantially 20°. The magnitude of the angle $\gamma$ is changed when the level of the axis of rotation of the supporting member 35 is altered by entering the bolts 36 through alternative holes 37. It will, of course, be realised that the distance relationship between the region of the external surface of the supporting member 35 that faces the soil working member 2A and the plane A—A is also true for the plane which contains the axes *a* of the single row of shafts 2.

Two shield plates 38 that are normally substantially vertically disposed, and that extend substantially parallel to the direction A, are arranged immediately beyond the opposite ends of the single row of soil working members 2A, said shield plates 38 being coupled by arms to pivotal mountings on top of the frame portion 1 in such a way that they can turn upwardly and downwardly about the axes defined by those pivotal mountings to match undulations in the surface of the soil over which their lower edges slide during the use of the rotary harrow. The shield plates 38 serve partly to prevent or minimise ridging of the soil at the edges of the broad strip thereof that is displaced by the soil working members 2A during the operation of the harrow and partly to prevent stones and other potentially injurious articles from being flung laterally of the path of travel of the harrow by its rapidly moving soil working tines. A central region of the front of the frame portion 1 with respect to the direction A is provided with a coupling member or trestle 39 of generally triangular configuration. As illustrated in outline in FIG. 1 of the drawings, the coupling member or trestle 39 is employed in connecting the frame of the harrow to the three-point lifting device or hitch at the rear of an agricultural tractor or other vehicle which moves and operates the harrow during its use. One of the shafts 2 of the center pair of soil working members 2A has an upward extension into a gear box 40 that is mounted on top of the frame portion 1. The shaft extension that is located inside the gear box 40 is in driven connection with a rotary input shaft 42 of that gear box through the intermediary of bevel pinions and a change-speed gear 41 mounted at the back of the gear box. The change-speed gear 41 comprises a plurality of interchangeable and/or exchangeable pinions of which a pair can be selected to enable a corresponding transmission ration between the rotary input shaft 42 and a further parallel shaft within the gear box 40 to be employed thus enabling the shafts 2 to be rotated at different speeds in response to an unchanged speed of rotation applied to the rotary input shaft 42. The rotary input shaft 42 has a splined or otherwise keyed end that projects forwardly from the gear box 40 in substantially the direction A and that end is arranged to be placed in driven connection with the power take-off shaft of an agricultural tractor or other operating vehicle by way of an intermediate telescopic transmission shaft 43, which is of a construction that is known per se, having universal joints at its opposite ends. It can be seen in FIGS. 1 to 3 of the drawings that each of the shafts 2 is provided, inside the hollow frame portion 1, with a corresponding straight- or spur-tooth pinion 44 and that the teeth of each pinion 44 are in mesh with those of its immediate neighbour, or both of its immediate neighbours, in the single row of pinions 44. Thus, rotation of the shaft 2 and pinion 44 that are directly driven from the gear box 40 causes rotation of all of the other shafts 2, and corresponding soil working members 2A, in the directions B(FIGS. 1 and 5), each direction of rotation B being opposite to the direction of rotation B of the immediately neighbouring soil working member 2A, or each of the two immediately neighbouring soil working members 2A, in the single row thereof.

The rotary harrow that has been described with reference to FIGS. 1 to 5 of the drawings is particularly, but not exclusively, suitable for dealing with soil that contains an above average proportion of stones. This suitability is obtained as a result of the particular tine structure that is employed together with the form of mounting of those tines. In this connection, it will be recalled that the uppermost ends of the substantially cylindrical tine holders 6 of each member 2A are further apart from one another, and thus from the corresponding axis of rotation $a$, than are the lowermost ends thereof, said tine holders 6 thus having surfaces that are inclined to the vertical from top to bottom in directions generally inwardly towards the corresponding axis $a$. The suitability of the harrow for dealing with very stony soil is further improved by arranging the upper ends of the holders 6 in advance of the lower ends thereof with respect to the intended directions of rotation B of the corresponding soil working members 2A. When one of the tine holders 6 strikes a stone during operation of the harrow, that stone tends to be urged downwardly along the inclined leading surfaces (with respect to the direction B) of the holder 6 itself and its screen 7. A stone that has been downwardly displaced in this way is most unlikely to cause further trouble because, after initially extending towards one another, the active or soil working portions 10 of the two tines 9 of each soil working member 2A are inclined outwardly away from each other so that the lower regions thereof that penetrate displacingly into the ground are well spaced apart. The likelihood of stones jamming between the two tines 9 of a single soil working member 2A is thus so low that its occurrence is quite uncommon and does not constitute a significant cause of operational stoppages. Since the screens 7 are shaped to match the lower surface of the frame portion 1 and the corresponding bearing housings 8A, insufficient space is left between those parts for any but the most unusually shaped stone to become jammed and even such a rare stone will usually be so thin that it will break and fall away before any significant damage can be caused. The circular paths described by the tine holders 6 at the ends of the supports 3 do not overlap each other to any appreciable extent and the tendency for stones to get jammed between the tine mountings of neighbouring soil working members 2A is thus so low as to be insignificant.

The cylindrical roller which affords the supporting member 35 is located in front, with respect to the direction A, of the soil working members 2A and occupies a position which is such that, during operation, it bears upon the surface of the soil over a distance, in the direction A, which is equal to not less than substantially the radius of the roller. There will, of course, be instants at which this relationship is not true, particularly when the harrow is operating on very arid and/or stony soil. The supporting member 35 has a levelling effect which generally improves the operation of the harrow since large accumulations of soil in front of the members 2A are avoided. On fields that have a very large number of stones, the supporting member 35 acts also to protect the frame portion 1, the mountings of the tines 9 and their fastening portions 8 from damage because said member 35 tends to press downwardly into the soil any loose stones which it meets lying upon the surface of the ground before those stones are engaged by the soil working members 2A. It is thus uncommon for the fastening portions 8 of the tines 9, their mountings or the frame portion 1 to come directly into contact with undisplaced stones. The tendency for stones to become jammed between the rear of the supporting member 35 and the tine mountings (particularly the holders 6 thereof) is very low because, due to the relationship between the lower region of the rearwardly facing outer surface of the supporting member 35 and the plane A—A (FIG. 2) that has been discussed above, any stone in this area can readily escape in a downward direction and the tine holders 6 will generally co-operate with the rear of the supporting member 35 in pushing any stone in this area out of harm's way.

When the tines 12A shown in FIG. 6 of the drawings are employed, sufficient space is left between the tines of neighbouring soil working members 2A for conducting away potentially damaging stones. This is also true of the tines 20 provided in accordance with FIG. 10 of the drawings and is correct in respect of the tines 17 of FIG. 8 although, in the latter case, the spacing is not quite so large as with the other embodiments. It will be noted that, when the tines 20 illustrated in FIG. 10 are employed, the free end or tip regions 23 of the active or soil working portions 19A work overlapping strips of soil and, due to their dispositions as compared with the dispositions of corresponding regions of the active or soil working portions of the other tines that have been described, the actual lengths thereof that perform this operation are greater. It will be noted that it is possible to set the active or soil working portions of the tines in operating positions that are different to those illustrated in the drawings by temporarily loosening the nuts 11A, turning the fastening portions 8 through appropriate angles about the axes $h$ and finally re-tightening the nuts 11A. With the construction that has been described, an angular displacement about the axis $h$ of 60°, or a multiple of 60°, is necessary (see FIGS. 2 and 4 of the drawings).

Although effective protection of the fastening portions 8 of the tines and of the mountings of those tines is provided by the constructions and arrangements thereof that have been described, an important improvement in this protection resides in the provision of a supporting member in front of the soil working members 2A, particularly when the rotary harrow is to be employed for working soil that contains a high proportion of stones. It is pointed out, in this connection, that the supporting member also protects the front of the frame portion 1 with respect to the direction A, it clearly being necessary that the frame portion 1 should not be seriously damaged by stones and other hard articles if the harrow is to function correctly.

Figures 7, 9:
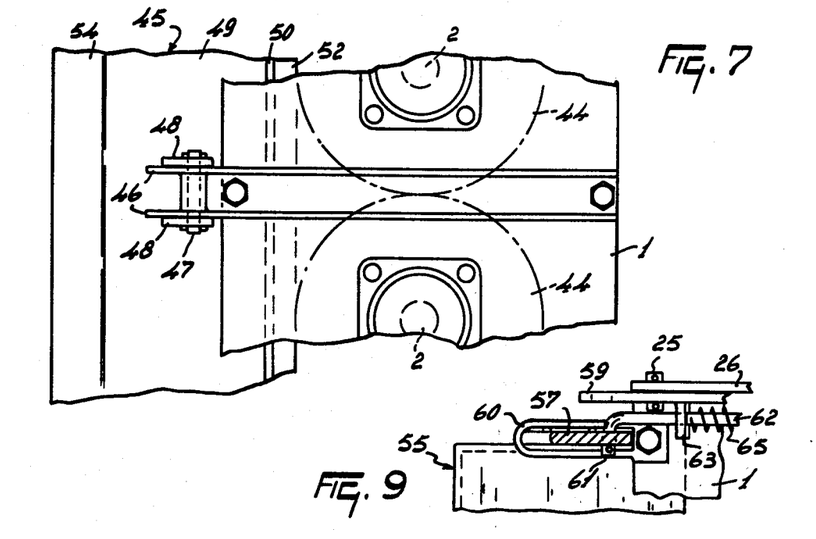
FIG. 7 is a plan view as seen in the direction indicated by an arrow VII in FIG. 6.
FIG. 9 is a plan view as seen in the direction indicated by an arrow IX in FIG. 8.

FIGS. 6 and 7 of the drawings illustrate the provision of the rotary harrow with a supporting member 45 that is of cylindrical construction but not of circular cross-section. The supporting member 45 is disposed at the front of the rotary harrow with respect to the direction A and is suspended from at least two spaced supports 46 mounted on top of the frame portion 1. Each support 46 is of channel-shaped cross-section and is disposed with its base in contact with the top of the frame portion 1 and its limbs directed upwardly therefrom. Each support 46 extends substantially parallel to the direction A and projects beyond the front of the frame portion 1 with respect to that direction. The forwardly projecting portion of each support 46 carries a corresponding pivot pin 47, the pivot pins 47 being substantially horizontally aligned in a direction parallel to the row of soil working members 2A and thus, normally, substantially perpendicular to the direction A. The substantially flat top 49 of the supporting member 45 carries as many pairs of lugs 48 as there are supports 46 and each pair of lugs 48 is turnably connected to the corresponding support 46 by the corresponding pivot pin 47. The supporting member 45 extends throughout substantially the whole working width of the harrow and its longitudinal axis is parallel or substantially parallel to a plane containing all the axes $a$ of the single row of shafts 2.

Athough the top 49 of the member 45 is substantially flat, a considerable part of its cross-section is of curved configuration and the maximum width of that cross-section extends in the same general direction as the direction A. The flat top 49 is normally inclined to the horizontal in such a way that, as can be seen in FIG. 6 of the drawings, said top extends upwardly from rear to front with respect to the direction A. The rearmost edge of the flat top 49 takes the form of a downwardly directed angular bend beneath which there is a flat stop portion 50 which normally, as illustrated in FIGS. 6 and 7, bears aganist an abutment surface formed by a front region of the main frame portion 1. The lowermost edge of the flat stop portion 50 is bent over angularly forwards with respect to the direction A to form a narrow flat portion 51 that is directed downwardly and forwardly from the portion 50 with respect to the direction A. The lowermost edge of the narrow flat portion 51 is, in turn, bent back angularly to form a broad flat portion 52 that extends down to the bottom of the supporting member 45. The lowermost edge of the broad flat portion 52 is at substantially the same horizontal level as the bottoms of the tine holders 6 and said portion 52 extends parallel, or approximately parallel, to the axes $h$ of those holders 6 when the latter are in their positions of furthest advancement with respect to the direction A around the axes $a$. The bottom of the supporting member 45 that extends forwardly from the lowermost edge of the portion 52 is afforded first by a substantially flat or very gently curved portion 53 that is orientated forwardly and upwardly and, secondly, by a leading curved portion 54 whose uppermost edge coincides with the leading edge of the flat top 49.

In the use of the rotary harrow as illustrated in FIGS. 6 and 7 of the drawings, the cylindrical supporting member 45 can pivot freely about the axis defined by the pins 47 within the limits defined by the flat stop portion 50 thereof and abutment of the flat top 49 against bevelled leading edges of each support 46. During operation under average working conditions, the supporting member 45 bears upon the ground surface throughout a width, in the direction A, that is substantially equal to the radius of a circle whose diameter is the same as the maximum cross-sectional diameter of the member 45 as seen in FIG. 6 of the drawings. This diameter is substantially equal to the maximum width of the member 45 as measured in the direction A and is also substantially equal to the distance between two neighbouring axes $a$ and to the length of the active or soil working portion 13 of a single one of the tines 12A.

In the embodiment of FIGS. 8 and 9 of the drawings the rotary harrow has a supporting member 55 which, like the supporting member 35, is of right circular cylindrical configuration but which is angularly adjustable, rather than rotatable, about substantially horizontally aligned stub shafts 56 relative to upright arms 57. The arms 57 have their upper ends pivotably connected to arms 59 by strong substantially horizontally aligned pins 58. The arms 59 are integral with the sector plates 24 and are located at the top and front of those sector plates with respect to the direction A. Each of the arms 57 extends through a slot in a corresponding bracket 60 that is fastened to the top of the frame portion 1. Each arm 57 is thus turnable to a limited extent about the corresponding pivot pin 58 within the limits that are defined by the opposite ends of the slot in the corresponding bracket 60. The opposite edges of each slot also serve a guiding function for the corresponding arm 57. Each arm 57 is also turnably connected to one end of a corresponding rod 62 by means of a pivot pin 61 that is afforded by the bentover end of the rod 62 concerned. Each rod 62 is axially slidable through an eye 63 carried by the corresponding arm 59 and carries a stop ring 64 at or near the end thereof that is remote from the corresponding pivot pin 61. A helical compression spring 65 is wound around each rod 62 so as to bear between the corresponding eye 63 and corresponding stop ring 64 and it will be evident from FIG. 8 of the drawings that the springs 65 urge the arm 57 and the supporting member 55 which those arms carry in an anticlockwise direction, as seen in FIG. 8, about the axis defined by the pivot pins 58. The arms 57 normally bear against stops defined by the rearmost ends of the slots in the brackets 60. The opposite ends of the supporting member 55 are secured to the arms 57 by bolts 66 and the member 55 can occupy any chosen one of four different angular settings about the axis defined by the stub shafts 56 relative to the arms 57 by temporarily removing the bolts 66, making the required angular adjustment, and subsequently replacing those bolts.

The supporting member 55 operates in a very similar manner to the previously described supporting member 35 except that, in contradistinction to the member 35, it does not revolve during operation. However, in this case, if at least one stone or other potentially damaging hard article should get in between the member 55 and one or more tine mountings the member 55 can yield pivotably forwards about the axis defined by the pivot pins 58 against the action of the compression springs 65. That region of the member 55 which contacts the ground surface will, of course, inevitably be subject to wear and, when it has become worn to an unacceptable extent, the bolts 66 may be temporarily removed and the member be turned through 90° about the axis defined by the stub shafts 56 to bring a fresh substantially unworn region of the member 55 into a position in which it will contact the ground. The bolts 66 are then replaced. The useful life of the member 55 can thus be considerably prolonged.

FIG. 10 of the drawings illustrates the provision of a cylindrical supporting member 67 that is of substantially square cross-section. It will be evident from a comparison between FIGS. 8 and 10 of the drawings that the non-rotatable member 67 is mounted substantially the same way as the member 55 although the different cross-sectional shape of the member 67 necessitates some consequential alteration in the shapes of the arms 57 and brackets 60. The supporting member 67 is arranged so that, as seen in cross-section (FIG. 10) a diagonal between two of its opposite corners is substantially vertical while a diagonal between its opposite two corners is substantially horizontal. The arms 57 again normally bear against the stops that are afforded by the rearmost ends of the slots in the brackets 60 but said arms 57 may also normally bear against a leading upper edge region of the main frame portion 1. This is also true of the embodiment of FIGS. 8 and 9 of the drawings. In the embodiment of FIG. 10, the angle $a$ has a magnitude of substantially 45° and is measured between the plane A—A and the flat lower surface of the supporting member 67 that faces rearwardly towards the soil working members 2A. The angle is measured at a level which is the same as, or just beneath the level of the axis defined by the stub shafts 56. The non-rotatable supporting member 67 operates in a very similar manner to the previously described supporting member 55 but the large downwardly opening angle that results from the square cross-section and from the mounting of the member 67 ensures that there is a large space available for guiding away any stones which might tend to get jammed in this area. The sharp downwardly directed corner of the square cross-section supporting member 67 is particularly effective in levelling a strip of soil immediately before that soil is worked by the tines 20. Once said edge is worn to an unacceptable extent, it is only necessary temporarily to remove the bolts 66, to turn the member 67 through 90° about the axis defined by the stub shafts 56 and to replace the bolts 66 to bring a new substantially unworn edge into the lowermost operative position.

Although certain features of the rotary harrows that have been described and/or that are illustrated in the accompanying drawings will be set forth in the following claims as inventive features, it is emphasised that the invention is not necessarily limited to those features and that it includes within its scope each of the parts of each rotary harrow that has been described and/or that is illustrated in the accompanying drawings both individually and in various combinations.

I claim:

1. A rotary harrow comprising a frame and coupling means on said frame for attachment to a prime mover, a plurlaity of soil working members rotatably mounted on shafts journalled on said frame and driving means connected to rotate said soil working members, said shafts and soil working members extending in a row transverse to the normal direction of travel of the harrow, said soil working members each comprising a support rotatable on a generally vertical shaft and at least one tine that has a lower soil working portion depending downwardly from said support to contact the ground, screening means mounted on said cultivator and said screening means having an inclined surface that extends across the working width of said row immediately adjacent and in front of said supports, said inclined surface facing said soil working member supports and at least the lower portion of the inclined surface extending downwardly away from a plane that passes through the vertical shafts that define the axes of rotation of said row of soil working members, said screening means comprising a hollow member which can be fixed in operative position and said member having a longitudinal axis that extends transverse to the direction of travel, said hollow member connected to the frame with releaseable fastening means, said hollow member being turnable about its longitudinal axis to any one of a plurality of positions and fixable in that position by said fastening means.

2. A harrow as claimed in claim 1, wherein said tube has a substantially circular cross-section.

3. A harrow as claimed in claim 1, wherein said tube has a substantially rectangular cross-section.

4. A harrow as claimed in claim 1, wherein said tube has a substantially square cross-section.

* * * * *